(12) United States Patent
Best, III et al.

(10) Patent No.: US 11,952,272 B1
(45) Date of Patent: Apr. 9, 2024

(54) PROCESS FOR PRODUCING HYDROGEN PRODUCT HAVING REDUCED CARBON INTENSITY

(71) Applicant: Kraken Technology Holdings, LLC, Houston, TX (US)

(72) Inventors: Byron Gladus Best, III, Katy, TX (US); Christopher Michael Miller, Richmond, TX (US); Anna Louise Buckley, Houston, TX (US); John Edwin Plumlee, Katy, TX (US); Bengt Arne Jarlsjo, Houston, TX (US); Daniel Joseph Shapiro, Houston, TX (US)

(73) Assignee: Kraken Technology Holdings, LLC, Houston, TX (US)

( * ) Notice: Subject to any disclaimer, the term of this patent is extended or adjusted under 35 U.S.C. 154(b) by 0 days.

(21) Appl. No.: 18/118,887

(22) Filed: Mar. 8, 2023

Related U.S. Application Data

(63) Continuation of application No. 18/117,606, filed on Mar. 6, 2023.

(Continued)

(51) Int. Cl.
*C01B 3/02* (2006.01)
*C01C 1/04* (2006.01)

(52) U.S. Cl.
CPC .............. *C01B 3/025* (2013.01); *C01C 1/04* (2013.01); *C01B 2203/0205* (2013.01);

(Continued)

(58) Field of Classification Search
None
See application file for complete search history.

(56) References Cited

U.S. PATENT DOCUMENTS

| 7,753,972 B2 | 7/2010 | Zubrin et al. |
| 8,809,015 B2 | 8/2014 | Schultz et al. |

(Continued)

FOREIGN PATENT DOCUMENTS

| DE | 102009018126 A1 * | 10/2010 |
| FR | 3120317 A1 | 9/2022 |

(Continued)

OTHER PUBLICATIONS

PCT Application No. US2023/016819; Search Report and Written Opinion of the EPO Searching Authority for Applicant Kraken Technology Holdings, LLC dated Aug. 1, 2023.

(Continued)

*Primary Examiner* — Joseph D Anthony
(74) *Attorney, Agent, or Firm* — Spencer Fane, LLP

(57) ABSTRACT

A method for producing hydrogen product having a low carbon intensity is provided. The method includes the steps of: (a) converting a hydrocarbon feedstock to a hydrogen product using a hydrocarbon reforming process; (b) providing at least some of the required energy for the hydrogen production process from a biomass power plant; and (c) processing one or more flue gas streams from the biomass power plant in a carbon capture unit to reduce $CO_2e$ emissions. The hydrogen product has a carbon intensity preferably less than about 1.0 kg $CO_2e$/kg $H_2$, more preferably less than 0.45 kg $CO_2e$/kg $H_2$, and most preferably less than 0.0 kg $CO_2e$/kg $H_2$.

26 Claims, 7 Drawing Sheets

Related U.S. Application Data

(60) Provisional application No. 63/409,331, filed on Sep. 23, 2022.

(52) U.S. Cl.
CPC ............... *C01B 2203/0283* (2013.01); *C01B 2203/0475* (2013.01); *C01B 2203/068* (2013.01); *C01B 2203/0811* (2013.01); *C01B 2203/1241* (2013.01); *C01B 2203/84* (2013.01); *C01B 2203/86* (2013.01)

(56) References Cited

U.S. PATENT DOCUMENTS

| | | | |
|---|---|---|---|
| 9,732,281 B2* | 8/2017 | Kresnyak | C01B 3/56 |
| 10,287,508 B2 | 5/2019 | Jack et al. | |
| 10,487,274 B2 | 11/2019 | Colyar et al. | |
| 10,947,492 B2 | 3/2021 | Harmon et al. | |
| 11,270,393 B2 | 3/2022 | Whikehart et al. | |
| 2004/0265651 A1* | 12/2004 | Steinberg | C01B 3/24 |
| | | | 429/495 |
| 2006/0207178 A1 | 9/2006 | Hsu | |
| 2016/0362610 A1* | 12/2016 | Kresnyak | C07C 273/04 |
| 2019/0315640 A1 | 10/2019 | Solunke et al. | |
| 2022/0119269 A1 | 4/2022 | Huckman | |

FOREIGN PATENT DOCUMENTS

| | | |
|---|---|---|
| WO | 2010/143980 A1 | 12/2010 |
| WO | 2021/035352 A1 | 3/2021 |
| WO | 2021/110757 A1 | 6/2021 |
| WO | 2021/189137 A1 | 9/2021 |
| WO | 2022/217365 A1 | 10/2022 |

OTHER PUBLICATIONS

Antonini, Cristina, et al. "Hydrogen production from natural gas and biomethane with carbon capture and storage—A techno-environmental analysis." Sustainable Energy & Fuels 4.6 (2020): 2967-2986.
"Bioenergy with Carbon Capture and Storage," Sep. 2022; retrieved from https://www.iea.org/reports/bioenergy-with-carbon-capture-and-storage on Mar. 22, 2023; 8 pages, International Energy Agency.
"Biomass Explained," Jun. 2, 2022; retrieved from https://www.eia.gov/energyexplained/biomass/ on Mar. 16, 2023; 3 pages, EIA U.S. Energy Information Administration.
"Drax to pilot Europe's first carbon capture storage project," May 20, 2018; retrieved from https://www.drax.com/press_release/drax-to-pilot-europes-first-carbon-capture-storage-project-beccs/; 14 pages, Drax Global.
"Biomass for Power Generation Generation and CHP," Jan. 2007; 4 pages, IEA Energy Technology Essentials.
MacDowell, et al. "Inefficient power generation as an optimal route to negative emissions via BECCS?," 12 pages, IOP Publishing, Environ. Res. Lett 12 (2017).
"Surveying the BECCS Landscape," Jan. 2022; 124 pages, Energy Futures Initiative.
Sanchez, et al. "A commercialization strategy for carbon-negative energy," Jan. 13, 2016; retrieved from https://gspp.berkeley.edu/research-and-impact/news/recent-news/a-commercialization-strategy-for-carbon-negative-energy on Mar. 28, 2023; 9 pages.
Clarke, et al. "Carbonomics the clean hydrogen revolution," Feb. 4, 2022, Part 1 of 2 (pp. 1-62); Goldman Sachs.
Clarke, et al. "Carbonomics the clean hydrogen revolution," Feb. 4, 2022, Part 2 of 2 (pp. 63-123); Goldman Sachs.
Heid, et al. "Five charts on hydrogen's role in a net-zero future," Oct. 25, 2022; retrieved Mar. 22, 2023 from https://www.mckinsey.com/capabilities/sustainability/our-insights/five-charts-on-hydrogens-role-in-a-net-zero-future#/; 9 pages, McKinsey Sustainability.
"Global Hydrogen Review," Sep. 2022; pp. 1-284, International Energy Agency.
"Status and perspectives of non-biogenic renewable gases," Mar. 2022; pp. 1-89, IEA Bioenergy Technology Collaboration Programme.
Cumicheo, et al. "Natural Gas and BECCS: a comparative analysis of alternative configurations for negative emissions power generation," Sep. 25, 2018; 32 pages, Journal of Greenhouse Gas Control.
Williams, Robert H. "Fuel Decarboniztion for Fuel Cell Applications and Sequestration of the Separated CO2," Jan. 1996; 50 pages, Center for Energy and Environmental Studies, PU/CEES Report No. 295.
"Thunderstruck—Fidelis New Energy's GigaSystem Gears Up to Produce Sustainable Aviation Fuel, Renewable Diesel," Jul. 11, 2022, 8 Pages, Jason Lindquist, Renewable Energy Analytics.
"Thunderstruck—Part 2—Producers of Renewable Diesel, Sustainable Aviation Fuel to Gain from New Climate Bill," Aug. 25, 2022; 6 pages, Jason Lindquist, Renewable Energy Analytics.
Temple, James. "This fuel plant will use agricultural waste to combat climate change," Feb. 15, 2022; retrieved from https://www.technologyreview.com/2022/02/15/1045317/fuel-plant-agricultural-beccs-waste-climate-change/ on Mar. 28, 2023; 13 pages, MIT Technology Review.
"Clean Hydrogen & Negative CO2 Emissions;" retrieved from https://netl.doe.gov/carbon-management/gasification/negative_ghg_emissions on Mar. 28, 2023; 3 pages, National Energy Technology Laboratory.
Paolo, et al. "Enabling low-carbon hydrogen supply chains through use of biomass and carbon capture and storage: A Swiss case study." pp. 1-15, Applied Energy 275 (2020): 115245.
"Hydrogen patents for a clean energy future—A global trend analysis of innovation along hydrogen value chains," Jan. 2023; 70 pages, International Energy Agency.
"Hydrogen Production," Apr. 2016, pp. 1-2, U.S. Department of Energy, Energy Efficiency & Renewable Energy.
Larson, et al. "Pinceton's Net-Zero America study Annex L: Hydrogen and Synthetic Fuels/Feedstocks Transition," Aug. 1, 2021; pp. 1-21, Andlinger Center for Energy and the Environment, Princeton University.
Gul, et al. "Opportunities for Hydrogen Production with CCUS in China," Nov. 2022, International Energy Agency.
Rosa, et al. "Potential for hydrogen production from sustainable biomass with carbon capture and storage." Renewable and Sustainable Energy Reviews 157 (2022): 112123.
Alderson, Tony. "Zero Carbon Hydrogen—Is it Achievable?" retrieved from https://www.wsp.com/en-kw/insights/zero-carbon-hydrogen-is-it-achievable on Mar. 28, 2023; 8 pages, WSP.
Bioret, et al. "Hydrogen Hubs: Get to Know the Encouraged Applicants;" retrieved from https://www.resources.org/common-resources/hydrogen-hubs-get-to-know-the-encouraged-applicants/ on Mar. 22, 2023; 20 pages.
Jiang, et al. "US Inflation Reduction Act—A Tipping Point in Climate Action," Sep. 28, 2022; Part 1 (pp. 1-52), Credit Suisse.
Jiang, et al. "US Inflation Reduction Act—A Tipping Point in Climate Action," Sep. 28, 2022; Part 2 (pp. 53-104), Credit Suisse.
Jiang, et al. "US Inflation Reduction Act—A Tipping Point in Climate Action," Sep. 28, 2022; Part 3 (pp. 105-163), Credit Suisse.
Birol, Dr. Faith. "The Future of Hydrogen;" Jun. 2019; retrieved from https://www.iea.org/reports/the-future-of-hydrogen on Mar. 22, 2023; 10 pages, International Energy Agency.
Birol, Dr. Faith. "The Future of Hydrogen—Seizing today's opportunities," Jun. 2019; Part 1 (pp. 1-103), International Energy Agency.
Birol, Dr. Faith. "The Future of Hydrogen—Seizing today's opportunities," Jun. 2019; Part 2 (pp. 104-203), International Energy Agency.

* cited by examiner

PROCESS FOR PRODUCING HYDROGEN PRODUCT HAVING REDUCED CARBON INTENSITY

CROSS-REFERENCE TO RELATED APPLICATION

This application is a continuation of U.S. application Ser. No. 18/117,606 filed Mar. 6, 2023, which claims the benefit of U.S. Prov. App. No. 63/409,331 filed Sep. 23, 2022, which is incorporated by reference herein in its entirety.

BACKGROUND

The present invention relates to a method and process for producing hydrogen product having reduced carbon intensity. More specifically, the process includes a method for the production of hydrogen by autothermal reforming, steam methane reforming, or a combination of autothermal reforming and steam reforming of hydrocarbons, where the energy and/or process steam for hydrocarbon reforming, syngas conversion, and or carbon capture is provided by the combustion or gasification of various forms of biomass to reduce the carbon intensity of the hydrogen product. The process also includes a similar method for the production of reduced carbon intensity hydrogen derivatives, specifically ammonia, where the energy and/or process steam to produce the hydrogen derivative is generated from the combustion or gasification of various forms of biomass. In both methods, the biogenic carbon dioxide produced from the combustion or gasification of biomass is separated and removed in a carbon capture unit.

Hydrogen is widely considered a strong alternative as a decarbonized energy carrier and storage medium to reduce the carbon footprint of many industries, transportation, services, etc. As of 2022, over 90% of the world's hydrogen production is made by reforming of hydrocarbons (most typically natural gas) without carbon capture. Most commonly, two approaches are utilized in industry for reforming: (1) steam reforming is the endothermic reaction of water with hydrocarbon to produce synthesis gas, with the carbon monoxide in the synthesis gas shifted to carbon dioxide and hydrogen using the water gas shift reaction; and (2) autothermal reforming combines the exothermic oxidation of hydrocarbon with the steam reforming reaction in a single unit. Most existing hydrogen production units are utilizing a steam methane reformer (SMR) design.

In order to result in a net reduction of carbon emissions, hydrogen must be produced with low carbon technology and/or low carbon feedstocks. There are several currently available options for production of low and/or neutral carbon intensity hydrogen.

One option is hydrocarbon reforming with carbon capture. In this scenario, the captured carbon dioxide may be sequestered in a geologic repository or permanently stored in a for-use application.

Other currently available options for producing low and/or neutral carbon intensity hydrogen include reforming of biogenic hydrocarbons with low feed carbon intensity; electrolysis of water using low carbon power (typically solar, wind, hydro, or nuclear power); catalytic splitting of water using nuclear power; splitting of methane via methane pyrolysis; utilization of biogas or renewable natural gas as one or more of the feedstocks; and use of certified, low-methane leakage natural gas as one or more of the feedstocks.

Hydrogen carbon intensity may be evaluated using a life cycle analysis methodology such as Argonne National Laboratory's Greenhouse Gases, Regulated Emissions, and Energy Use in Technologies Model (GREET). The term "carbon intensity" refers to a measure of the amount of equivalent carbon dioxide ($CO_2e$) emitted to produce a specified amount of a product, such as hydrogen or ammonia. $CO_2e$ is a common unit used to sum various greenhouse gases based on their global warming potential (GWP). Hydrogen carbon intensity is frequently rated in kilograms of equivalent carbon dioxide per kilogram of hydrogen (kg $CO_2e$/kg $H_2$). Ammonia carbon intensity is similarly measured in kg $CO_2e$/kg $NH_3$.

Hydrogen production by hydrocarbon reforming is an endothermic process that requires both heat and energy, both of which contribute to the overall $CO_2e$ emissions of the hydrogen production process. Sources of $CO_2e$ emissions in the hydrogen production process comprise upstream emissions associated with the hydrocarbon feedstock (e.g. leakage from pipelines, energy emissions associated with processing, transportation, and compression of the hydrocarbon feedstock), emissions associated with the production of imported power or steam, and uncaptured $CO_2e$ emissions associated with the hydrogen reforming process (e.g. fired heater flue gases). The upstream emissions associated with the hydrocarbon feedstock are inherent to the process and can only be reduced, not fully eliminated, with lower carbon intensity feeds. The uncaptured $CO_2e$ emissions within the hydrogen plant battery limits can be reduced or eliminated with the use of carbon capture technology or modifications to heat transfer equipment such as utilizing hydrogen fired heaters to eliminate carbon dioxide in the flue gas. To close the energy balance, electricity and/or steam is imported to the facility. By utilizing low or neutral carbon power (solar, wind, hydro, or nuclear power), the $CO_2e$ emissions associated with the production of imported power or steam can be reduced or eliminated. Even with carbon capture technologies, responsibly sourced natural gas, and renewable energy, the lowest practically achievable hydrogen product carbon intensity is still greater than 1.0 kg $CO_2e$/kg $H_2$. Table 1 shows the resulting hydrogen product carbon intensity for different hydrogen reforming configurations.

TABLE 1

| Configuration | Basis | Carbon Intensity |
|---|---|---|
| Traditional Reforming | GREET Standard Natural Gas 13,724 g CO2e/MMBtu LHV U.S. Grid Electricity Mix 465 kg CO2e/MWh | >10 kg $CO_2e$/kg $H_2$ |
| Reforming with Carbon Capture | GREET Standard Natural Gas 13,724 g CO2e/MMBtu LHV U.S. Grid Electricity Mix 465 kg CO2e/MWh | 3.9-5.4 kg $CO_2e$/kg $H_2$ |
| Reforming with Carbon Capture and Certified Natural Gas | Responsibly Sourced Natural Gas 7,500 g CO2e/MMBtu LHV U.S. Grid Electricity Mix 465 kg CO2e/MWh | 2.1-2.8 kg $CO_2e$/kg $H_2$ |
| Reforming with Carbon Capture, Certified Natural Gas, and Renewable Power | Responsibly Sourced Natural Gas 7,500 g CO2e/MMBtu LHV Renewable Electricity 0.0 kg CO2e/kg MWh | 1.1-1.3 kg $CO_2e$/kg $H_2$ |

The passing of the Inflation Reduction Act (IRA) in 2022, the United States now provides a tax credit based on the carbon intensity of the lifecycle greenhouse gas emissions associated with the production of clean hydrogen, including a large tax credit for producing hydrogen with a carbon intensity <0.45 kg $CO_2$e/kg $H_2$. Producing hydrogen in accordance with the present invention preferably results in a product carbon intensity of <1.0 kg $CO_2$e/kg $H_2$, more preferably <0.45 kg $CO_2$e/kg $H_2$, and most preferably <0.0 kg $CO_2$e/kg $H_2$.

SUMMARY OF THE INVENTION

The present invention is directed to a method for producing hydrogen product having a carbon intensity preferably less than about 1.0 kg $CO_2$e/kg $H_2$, more preferably less than about 0.45 kg $CO_2$e/kg $H_2$, and most preferably less than about 0.0 kg $CO_2$e/kg $H_2$. The method includes the steps of (a) converting a hydrocarbon feedstock to a hydrogen product using a hydrocarbon reforming process; (b) providing at least some of the required energy for the hydrogen production process from a biomass power plant; and (c) processing one or more gas streams containing carbon dioxide from the biomass power plant and hydrogen reforming process in one or more carbon capture units to reduce $CO_2$e emissions.

The method further includes providing at least some of the required energy for one or more carbon capture units from the biomass power plant. The method further includes providing substantially all of the required energy for the hydrogen production process from the biomass power plant. The energy produced from the biomass power plant may include: (a) electricity generated from work produced by a Rankine cycle, Brayton cycle, or integrated gasification combined cycle; (b) steam that can be used as process steam in the reforming and water gas shift reactions; (c) steam that can be used as thermal energy; and (d) steam that can be used to power a mechanical drive for one or more compressors, pumps, or other motors generating shaft torque. The energy produced from the biomass power plant may be generated by direct combustion or gasification of the biomass feedstock.

The biomass feedstock comprises one or more renewably sourced fuels selected from woody biomass, municipal solid waste, sorted municipal solid waste, food waste, agricultural waste, landfill diversion, hurricane and construction debris, industrial processing biomass waste, renewable natural gas, or a combination thereof. The biomass feedstock may also include one or more co-fired fossil fuels. The hydrogen production process may also produce a tail gas from the hydrogen purification unit that is also co-fired with the biomass feedstock in the biomass power plant.

The present invention is also directed to a hydrogen product produced according to the methods provided herein. The hydrogen product preferably has a carbon intensity less than about 1.0 kg $CO_2$e/kg $H_2$, more preferably less than about 0.45 kg $CO_2$e/kg $H_2$, and most preferably less than about 0.0 kg $CO_2$e/kg $H_2$.

The present invention is also directed to a method for producing ammonia product having a carbon intensity preferably less than about 1.0 kg $CO_2$e/kg $NH_3$, more preferably less than about 0.5 kg $CO_2$e/kg $NH_3$, and most preferably less than about 0.0 kg $CO_2$e/kg $NH_3$. The method includes the steps of: (a) converting a hydrocarbon feedstock to a hydrogen intermediate product using a hydrocarbon reforming process; (b) converting the hydrogen intermediate product to an ammonia product using an ammonia synthesis process; (c) providing at least some of the required energy for the hydrogen production process and the ammonia synthesis process from a biomass power plant; and (d) processing one or more gas streams containing carbon dioxide from the biomass power plant and the hydrocarbon reforming process in one or more carbon capture units to reduce $CO_2$e emissions.

The method further includes providing at least some of the required energy for the one or more carbon capture units from the biomass power plant. The method further includes providing substantially all of the required energy for the hydrocarbon reforming process from the biomass power plant. The method further includes providing substantially all of the required energy for the ammonia synthesis process from the biomass power plant.

The present invention is also directed to an ammonia product produced according to the methods provided herein. The ammonia product preferably has a carbon intensity less than about 1.0 kg $CO_2$e/kg $NH_3$, more preferably less than about 0.5 kg $CO_2$e/kg $NH_3$, and most preferably less than about 0.0 kg $CO_2$e/kg $NH_3$.

DESCRIPTION OF FIGURES

The features and advantages of the present invention will be more clearly understood from the following description taken in conjunction with the accompanying drawings in which.

DETAILED DESCRIPTION OF THE INVENTION

The present invention relates to a method and process for producing hydrogen in which the energy for the process is provided by the combustion or gasification of various forms of biomass to reduce the carbon intensity of the hydrogen product to less than 1.0 kg $CO_2$e/kg $H_2$, more preferably less than 0.45 kg $CO_2$e/kg $H_2$, and most preferably less than 0.0 kg $CO_2$e/kg $H_2$. In all embodiments described herein, the biogenic carbon dioxide produced from the combustion or gasification of biomass is separated and removed in a carbon capture unit.

Furthermore, in all embodiments described herein, the electricity generated in the biomass power plant can equal, but does not have to equal, the total amount of electricity required for the hydrogen production plant. A person having ordinary skill in the art will understand that, in most applications, the biomass power plant can be sized to generate adequate electrical power to offset enough import grid power, and thereby achieve a targeted hydrogen carbon intensity.

Furthermore, in all embodiments described herein, the biomass feed to the biomass power plant can be a variety of fuel mixes including but not limited to: woody biomass, municipal solid waste (MSW), sorted MSW, food waste, agriculture waste, landfill diversion, hurricane and construction debris, industrial processing biomass waste, and renewable natural gas. A person having ordinary skill in the art will appreciate that fossil fuels, including but not limited to natural gas and/or fuel gas (i.e. propane and butanes), can also be co-fired with the biomass as required or desired.

Furthermore, in all embodiments described herein, the biomass power plant is selected from a Rankine cycle, or a Brayton cycle, or an integrated gasification combined cycle (IGCC) which consist of both a Rankine cycle and Brayton cycle.

Furthermore, where the biomass power plant configuration comprises a Rankine cycle, a biomass boiler produces heat from the direct combustion of biomass to generate steam for the Rankine cycle. In this configuration, the biomass boiler can either be a traditional air fired boiler or oxy-fired boiler using oxygen generated in an air separation unit (ASU) or otherwise supplied by a third-party. Furthermore, where the biomass power plant configuration comprises a Brayton cycle, the gasification of biomass produces a syngas product, with or without steam generation, that is purified before being combusted in the Brayton cycle. The exhaust heat from the Brayton cycle can be used to generate steam for a Rankine cycle.

Figure 1:
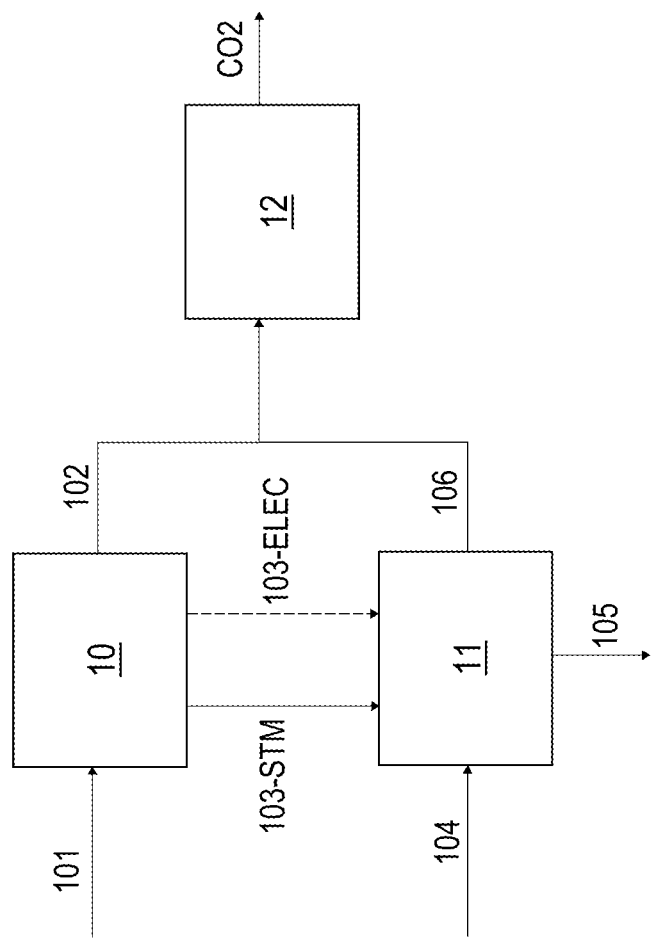
FIG. 1 depicts a process flow diagram for the production of hydrogen, in which required energy is produced in a biomass power plant with carbon capture.

FIG. 1 illustrates a first embodiment of the present invention, in which carbon negative energy 103, either in the form of steam or electricity, can be produced in the biomass power plant 10 by a Rankine cycle steam turbine using biomass combustion as the heat source. Biomass power plant 10 can be configured to directly combust the biomass feedstock 101 in a biomass boiler to generate steam. Alternatively, biomass power plant 10 can be configured as an IGCC power plant in which the biomass feedstock is gasified to create a syngas product with or without steam generation. The syngas can be combusted as fuel in a Brayton cycle gas turbine to generate electricity 103-ELEC. Steam 103-STM can also be generated with a heat recovery steam generator (HRSG) on the turbine exhaust. This steam can be used in a Rankine cycle to generate additional electricity 103-ELEC.

The generated steam from the biomass power plant can be sent to a steam turbine to produce electricity 103-ELEC. Furthermore, the steam 103-STM can also be sent directly to hydrogen plant 11, or can be extracted from the turbine and sent to hydrogen plant 11 depending on the steam pressure level requirements. This steam 103-STM can be used as process steam for the reforming and water gas shift reactions in hydrogen plant 11 or as thermal energy (such as process heating of an amine regenerator reboiler). Additional uses of this carbon negative energy (103-ELEC and 103-STM) within hydrogen plant 11 are discussed herein with respect to additional embodiments of the present invention.

In hydrogen plant 11, hydrocarbon feed 104 is reformed by either autothermal reforming, steam reforming, or a combination of autothermal reforming and steam reforming to produce low, neutral, and/or negative carbon intensity hydrogen product 105. The various reforming technologies are discussed in more detail herein with respect to specific embodiments of the present invention. As discussed above, in all embodiments with autothermal reforming, the required oxygen can be provided by an ASU, membrane, or other commercially available oxygen production technology, or can be provided at the plant fence line by a third-party supplier. Furthermore, hydrocarbon feed 104 includes but is not limited to fossil based natural gas, renewable natural gas, biogas, refinery off-gases, fuel gas, naphtha, and/or renewable naphtha.

In all embodiments, the low, neutral, and/or negative carbon intensity hydrogen product 105 can be utilized to produce low, neutral, and/or negative carbon intensity hydrogen derivatives and/or hydrogen carriers, including but not limited to ammonia.

Carbon dioxide can be all or partially captured from the flue gas stream from the biomass power plant and from the syngas stream and/or flue gas stream from the hydrogen plant. The purified carbon dioxide streams 102 and 106 can be compressed and sent to geologic sequestration or can be used external to the process. Carbon dioxide captured in the biomass power plant and any flue gas streams in the hydrogen plant, from either a fired preheater, utility boiler, and/or reformer, can be compressed in a single $CO_2$ compression unit 12. Biomass power plant 10 and hydrogen plant 11 can also have separate $CO_2$ compression units, not shown.

Figure 2:
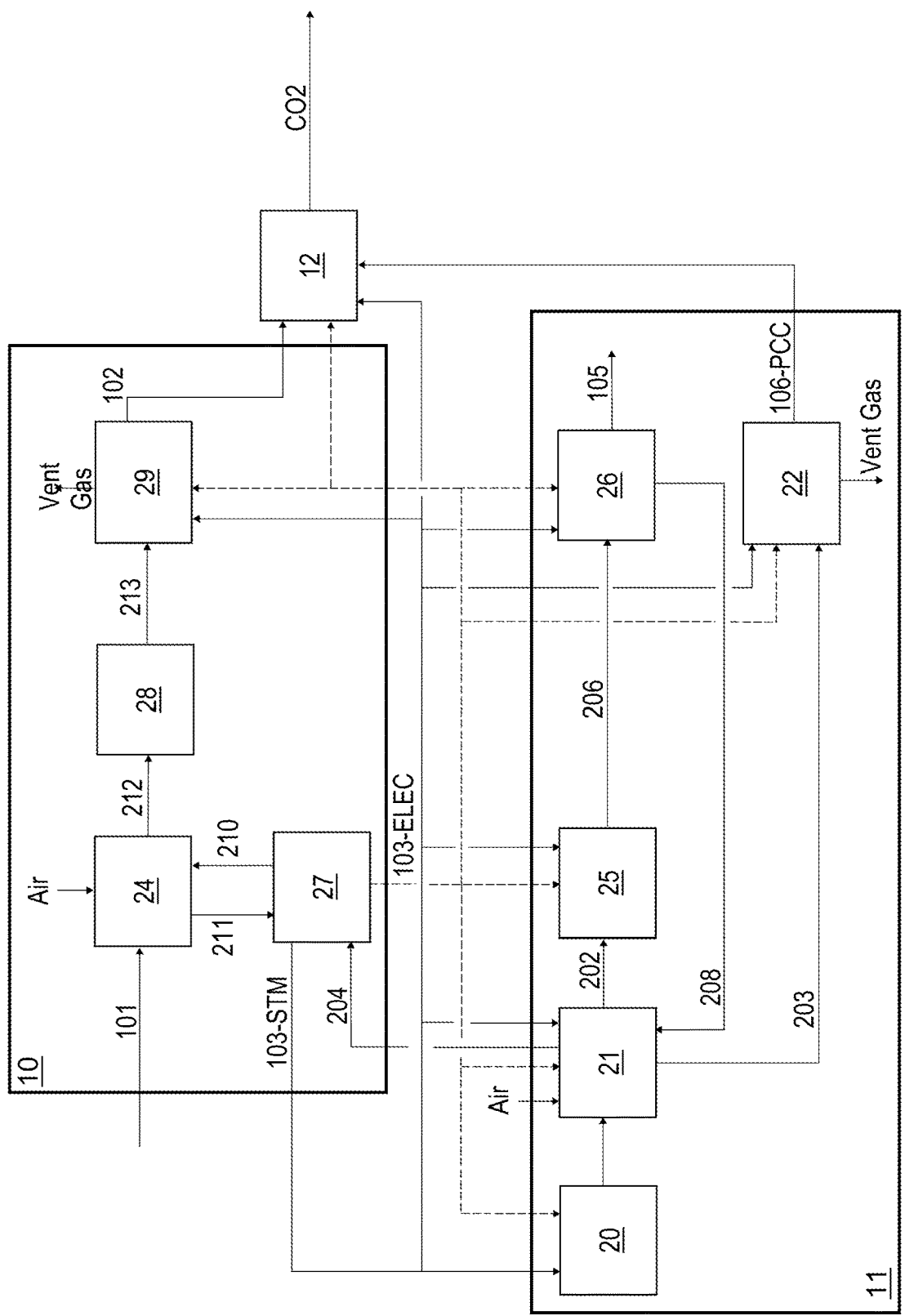
FIG. 2 depicts a process flow diagram for the production of hydrogen utilizing steam methane reforming with post-combustion carbon capture, in which required energy is produced in a biomass power plant with carbon capture.

In a second embodiment of the present invention, FIG. 2 illustrates a hydrogen production plant 11 utilizing steam methane reforming (SMR) with post-combustion carbon capture only. Carbon negative energy 103-ELEC and 103-STM, which is generated in the biomass power plant 10, can be sent to hydrogen plant 11 for various uses as described below.

Hydrocarbon feed 104 goes through the feed purification 20 to remove any sulfur compounds and other contaminants. The feed can also be compressed depending on the upstream operating pressure of the feed. Here, energy from biomass power plant 10 can be supplied in the form of electricity 103-ELEC and/or steam 103-STM for driving the feed gas compressor.

The purified feed is then sent to reformer 21. Depending on the composition of the purified feed, a pre-reformer may or may not be included as part of reformer 21 as would be understood by a person having ordinary skill in the art. As is well known, the catalytic SMR reaction in which steam and hydrocarbons, mainly methane, are converted to syngas, which consists of carbon monoxide and hydrogen, takes place in reformer 21. Biomass power plant 10 can provide both electrical energy 103-ELEC for auxiliary equipment, instrumentation, and controls, and process steam 103-STM to reformer 21 for the SMR reaction. In an SMR, fuel gas is combusted in the presence of air in a fired heater outside the reformer tubes. The heat of combustion drives the endothermic, SMR reaction. The fuel gas preferably consists of one or more of natural gas, hydrogen, and/or tail gas/reject gas 208 from the hydrogen purification unit 26.

The purified feed undergoing the SMR reaction passes through the reformer tubes packed with catalyst and exits the reformer as syngas 202. Flue gas 203 from the combustion of the fuel gas in the fired heater exits the reformer stack at low or atmospheric pressure. The heat of combustion in SMR flue gas 203 can be converted to make steam 204 from boiler feed water. Steam 204 can be sent to turbine 27 at biomass power plant 10 to generate additional electricity. Alternatively, steam 204 can be used elsewhere in hydrogen plant 11, or can be sent to a separate steam turbine located in hydrogen plant 11 to create additional electricity, or can be used external to the process (e.g. district heating).

Flue gas 203 can be sent to a post-combustion capture (PCC) unit 22 where the carbon dioxide in the flue gas is separated into purified carbon dioxide 106-PCC using either cryogenic process or an amine-based solution. The PCC unit 22 can receive carbon negative energy from biomass power plant 10 in three forms: (1) electrical power 103-ELEC which can be used to provide power to pump and/or compressor motors, including but not limited to the amine pumps (amine-based carbon capture), liquid carbon dioxide pumps (cryogenic carbon capture), auxiliary equipment, instrumentation, and controls; (2) thermal energy in the form of steam 103-STM for process heating requirements, including but not limited to the amine regenerator reboiler (amine-based carbon capture); and (3) steam drive energy to power the mechanical drive (e.g. turbines) of the pumps and/or compressors. The PCC unit 22 can be combined (not shown) with the biomass power plant 10's PCC unit 29.

Purified carbon dioxide 106-PCC can then be compressed in compression step 12 for geologic sequestration or for uses external to the process. $CO_2$ compression 12 can use electrical energy 103-ELEC from biomass power plant 10 to power the motor for the $CO_2$ compressor, power auxiliary equipment, instrumentation, and controls. Alternatively, steam 103-STM from biomass power plant 10 can be supplied directly to power the mechanical drive (e.g. turbines) for the $CO_2$ compressor. Hydrogen plant 11 and biomass power plant 10 can alternatively have individual $CO_2$ compression units (not shown) instead of the combined $CO_2$ compression 12.

Syngas 202 generated by the SMR is sent to the water-gas shift (WGS) reactor system 25 where carbon monoxide and water in the syngas 202 undergo a WGS reaction to form carbon dioxide and hydrogen in a single stream 206. Carbon negative energy can be supplied to the WGS in three forms: (1) electrical power 103-ELEC that can be used to provide power to pump and/or fan motors, including but not limited to the process condensate pumps, syngas air cooled heat exchangers, auxiliary equipment, instrumentation, and controls; (2) process steam 103-STM for use in the WGS reaction; or (3) steam drive energy to power the mechanical drive (e.g. turbines) of the pumps.

In hydrogen product purification unit 26, the carbon dioxide and/or methane is separated from the hydrogen to create a purified hydrogen product 105 that can be compressed for use. Commonly, the hydrogen purification unit 26 consists of a pressure swing adsorption (PSA) system, but other alternative technologies known in the art, such as membranes, can also be utilized to achieve purified hydrogen product 105. The tail gas/reject gas 208 from hydrogen purification unit 26, which consists mostly of carbon dioxide with trace amounts of methane, is recycled back, (optionally combined with a fuel gas stream) and combusted in reformer 21. The carbon dioxide in tail gas/reject gas 208 along with the carbon dioxide that is produced from combustion in the fired heater can also be captured in PCC unit 22. Biomass power plant 10 can provide both electrical energy 103-ELEC to power the motor for the hydrogen compressor, instrumentation, and controls. Alternatively, steam 103-STM from biomass power plant 10 can be supplied directly to power the mechanical drive (e.g. turbines) for the hydrogen compressor.

The energy and/or steam from biomass power plant 10 is generated by combusting the biomass feedstock 101 in boiler 24. The heat from the combustion of biomass feedstock 101 can be used to produce steam 211 from boiler feed water 210 that can be used to generate electricity in steam turbine 27. Not shown in FIG. 2, steam 211 can also be sent directly to hydrogen plant 11 for use as thermal energy for process heating requirements and/or power the mechanical drive for pumps and compressors, and/or be used as process steam to either the SMR or WGS reactions. Flue gas 212 from boiler 24 is sent through air quality control system 28, where it passes through several emissions reduction technologies such as a pulse jet fabric filter, dry sorbent injection system, selective catalytic reduction (SCR), and carbon monoxide catalyst. These environmental train technologies are optional to treat flue gas 212 depending on the specific site needs, and would be well understood by a person having ordinary skill in the art.

Also not shown in FIG. 2, electricity 103-ELEC and steam 103-STM from biomass power plant can be generated by the gasification of the biomass feedstock. The gasification of the biomass in the presence of air, steam, or oxygen results in a syngas product consisting of mostly carbon monoxide and hydrogen. Any impurities produced in the syngas are removed in a syngas clean-up step. The syngas can be combusted in a gas turbine to produce electricity 103-ELEC. Optionally, a HRSG can be included on the turbine exhaust to produce steam. This steam can be used to generate additional electricity in a steam turbine or can be sent directly to the hydrogen plant for use as thermal energy for process heating requirements and/or power the mechanical drive for pumps and compressors, and/or be used as process steam to either the SMR or WGS reactions. The exhaust from the HRSG can be sent to a post-combustion carbon capture unit to reduce $CO_2e$ emissions.

The treated flue gas 213 is then sent to the PCC unit 29. The PCC technology employed for carbon capture can include a cryogenic process or an amine-based solution. The PCC unit 29 can receive carbon negative energy in three forms: (1) electrical power 103-ELEC that can be used to provide power to pump and/or compressor motors, including but not limited to the amine pumps (amine-based carbon capture), liquid carbon dioxide pumps (cryogenic carbon capture), auxiliary equipment, instrumentation, and controls; (2) thermal energy in the form of steam 103-STM for process heating requirements, including but not limited to the amine regenerator reboiler (amine-based carbon capture); or (3) steam drive energy to power the mechanical drive (e.g. turbines) of the pumps and/or compressors.

Purified carbon dioxide 102 can be compressed in compression step 12 for geologic sequestration or can be used external to the process. $CO_2$ compression step 12 can use electrical energy 103-ELEC from biomass power plant 10 to power the motor for the $CO_2$ compressor, power auxiliary equipment, instrumentation, and controls. Alternatively, steam 103-STM from biomass power plant 10 can be supplied directly to power the mechanical drive (e.g. turbines) for the $CO_2$ compressor.

Energy from biomass power plant 10 can also be used in the balance of plant, offsites, and utility systems. The carbon negative energy can be in three forms: (1) electrical power 103-ELEC that can be used to provide power to pump and/or compressor motors, including but not limited to the boiler feed water pumps cooling water pumps, cooling tower fans, compressors located in the air separation unit, auxiliary equipment, instrumentation, and controls; (2) thermal energy in the form of steam 103-STM for process heating requirements, including but not limited to the stripping steam for the deaerator or steam tracing; or (3) steam drive energy to power the mechanical drive (e.g. turbines) of the pumps and/or compressors.

Typically, an SMR consists of a fired heater as described above; however, depending on the hydrogen reforming configuration an electrified steam methane reformer (eSMR) can also be utilized to convert the steam and hydrocarbon feed to syngas. Where the configuration includes an eSMR, it is well understood that no flue gas would be generated. In this configuration, the biomass power plant 10 can provide the electrical energy 103-ELEC directly to the reformer.

In another SMR configuration, the heat for the endothermic reaction could be provided by the direct combustion of biomass. In this configuration, the biogenic carbon dioxide in flue gas 203 can be sent to PCC unit 22.

Figure 3:
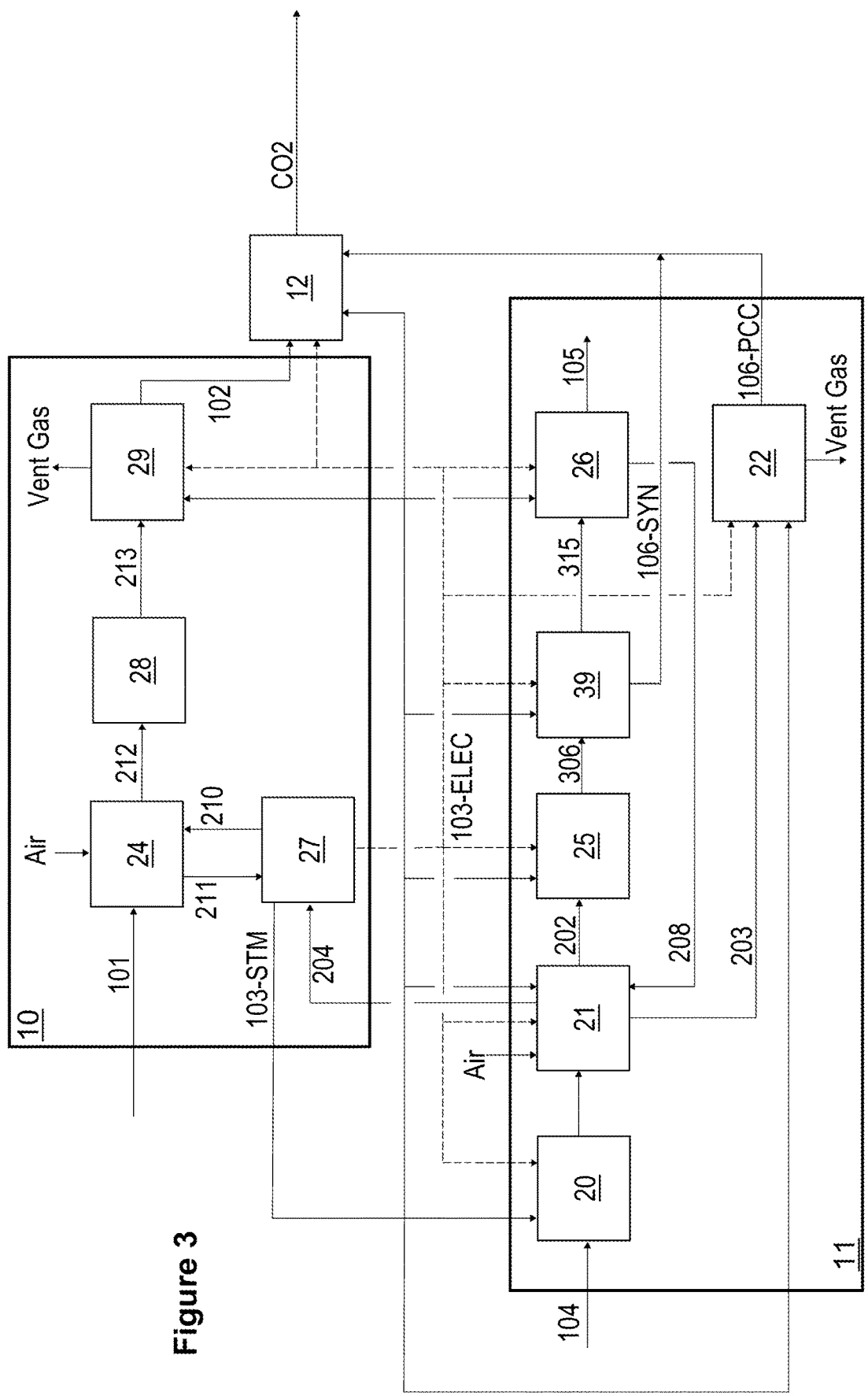
FIG. 3 depicts a process flow diagram for the production of hydrogen utilizing steam methane reforming with syngas carbon capture and post-combustion carbon capture, in which required energy is produced in a biomass power plant with carbon capture.

In a third embodiment of the present invention, FIG. 3 illustrates a similar embodiment to FIG. 2 for an SMR having an additional unit operation, specifically syngas carbon capture unit 39.

The hydrogen and carbon dioxide product 306 from the WGS reactor 25 can be sent to syngas carbon capture unit 39 where the carbon dioxide is separated using either a cryogenic process or an amine-based solution. Hydrogen stream 315 from syngas carbon capture unit 39 is sent to the purification unit 26, with product purification tail gas/reject gas 208, consisting of mostly of hydrogen, can be used for combustion in reformer 21. Captured carbon dioxide 106-SYN can be compressed in compression step 12 for geologic sequestration or can be used external to the process.

Syngas carbon capture unit 39 can receive carbon negative energy from biomass power plant 10 in three forms: (1) electrical power 103-ELEC which can be used to provide power to pump and/or compressor motors, including but not limited to the amine pumps (amine-based carbon capture), liquid carbon dioxide pumps (cryogenic carbon capture), auxiliary equipment, instrumentation, and controls; (2) thermal energy in the form of steam 103-STM for process heating requirements, including but not limited to the amine regenerator reboiler (amine-based carbon capture); or (3) steam drive energy to power the mechanical drive (e.g. turbines) of the pumps and/or compressors.

The majority of the carbon dioxide contained in hydrogen product purification tail gas/reject gas 208 has been removed in this third embodiment. Depending on the amount of carbon dioxide captured in the syngas carbon capture unit 39, reformer flue gas 203 contains very little (preferably zero) carbon dioxide. The inclusion of syngas carbon capture unit 39 in this third embodiment results in a smaller post-combustion capture unit 32 (as compared to the second embodiment illustrated in FIG. 2) since the carbon dioxide is more efficiently removed from the syngas. Depending on the desired carbon dioxide recovery, PCC unit 22 may also be eliminated.

Figure 4:
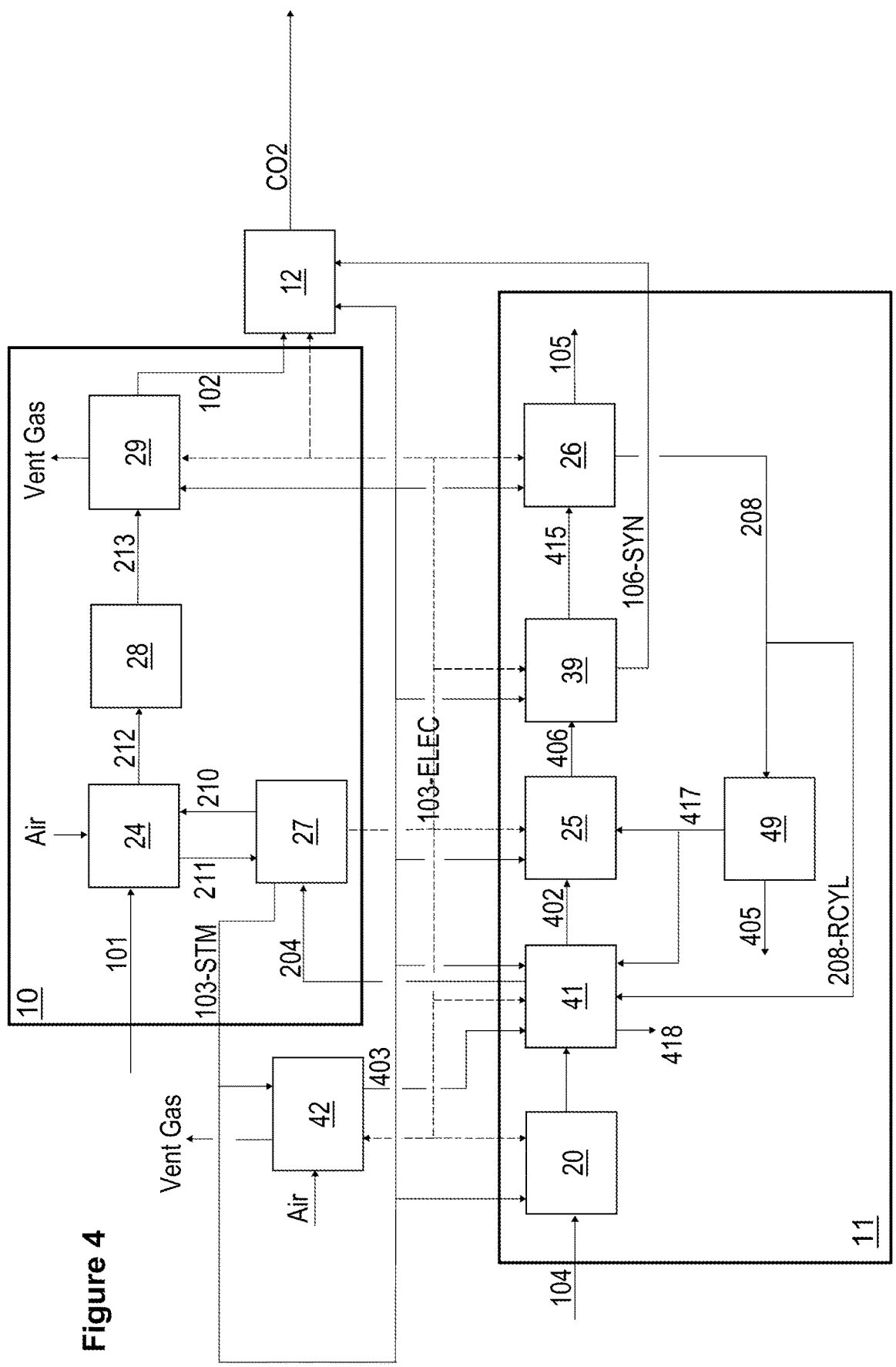
FIG. 4 depicts a process flow diagram for the production of hydrogen utilizing auto-thermal reforming, in which required energy is produced in a biomass power plant with carbon capture.

In a fourth embodiment of the present invention, FIG. 4 illustrates the use of auto-thermal reforming (ATR) instead of steam methane reforming as shown in FIGS. 2 and 3. Similar to FIGS. 2 and 3, the hydrocarbon feed 104 goes through feed purification and compression 20.

The purified feed is preheated and then reformed in reformer 41. There are multiple options for preheating the purified feed to reformer 41, including but not limited to a fired preheater and/or a gas heated reformer (GHR). With a fired preheater, the fuel gas to the fired preheater can consist of a combination of natural gas, fuel gas, and/or hydrogen. The purified feed is heated inside fired heater tubes. Flue gas 418 from the fired preheater exits the reformer stack at low or atmospheric pressure. Depending on the desired carbon dioxide recovery, a post-combustion carbon capture unit can also be included to capture the $CO_2$ from the fired preheater flue gas 418. The heat of combustion of flue gas 418 can be converted to make steam 204) from boiler feed water. Steam 204 can be sent to the turbine 27 at biomass power plant 10 to generate additional electricity. Alternatively, steam 204 produced in reformer 41 can be used elsewhere in the hydrogen plant, or can be sent to a separate steam turbine located in hydrogen plant 11 to create additional electricity, or can be used external to the process (e.g. district heating). As an alternative to the fired preheater, a GHR can be included upstream of reformer 41 to partially reform the feed to the ATR. Optionally, a configuration where a fired preheater and a GHR are both included upstream of reformer 41. Typically, in this configuration, a slip stream of the purified feed bypasses the fired preheater and can be sent directly to the GHR.

An ATR differs from an SMR in how heat is supplied to the reforming reaction. An ATR is a combination of the endothermic steam methane reforming reaction and the exothermic partial oxidation (PDX) reaction. The heat produced by the PDX reaction is used in the steam methane reforming reaction to generate syngas. In an ATR, the hydrocarbons are partially oxidized, in the presence of high purity oxygen 403 to form syngas product 402. Both reactions occur inside the reactor. The inclusion of a GHR to preheat the hydrocarbon feed utilizes the heat from the syngas effluent from the reformer to drive the steam methane reforming reaction and results in decreased fuel gas and oxygen consumption as more hydrocarbon feed undergoes the steam methane reforming reaction rather than the partial oxidation reaction. Biomass power plant 10 can provide both electrical energy 103-ELEC for auxiliary equipment, instrumentation, and controls, and process steam 103-STM to reformer 41 for the steam methane reforming reaction. Steam 417 for the steam methane reforming reaction can also be provided by utility boiler 49.

The PDX reaction requires high purity oxygen 403 which is supplied by the ASU 42. Carbon negative energy can be sent to ASU 42 as: (1) electrical power 103-ELEC that can be used to provide power to pump and/or compressor motors, including but not limited to the liquid oxygen pumps, electric heater for temperature swing absorption (TSA) bed regeneration, auxiliary equipment, instrumentation, and controls; (2) thermal energy in the form of steam 103-STM for process heating requirements, including but not limited to the TSA bed regeneration; and/or (3) steam drive energy to power the mechanical drive (e.g. turbines) of the pumps and/or compressors.

Syngas 402 from reformer 41 is sent to WGS reaction unit 25, syngas carbon capture 39, and a hydrogen product purification unit 26, all of which are similar unit operations to the embodiments described in the third embodiment (FIG. 3).

Tail gas/reject gas 208 from the hydrogen product purification unit 26 can be sent to utility boiler 49 to provide process steam 417 to ATR 41 and/or the WGS 25. The majority of the carbon dioxide and methane contained in tail gas/reject gas 208 has been removed in this embodiment because of the incorporation of the syngas carbon capture unit 39. Depending on the amount of carbon dioxide and methane captured in the syngas carbon capture unit 39, flue gas 405 from utility boiler 49 can be sent to a PCC unit. Alternatively, tail gas/reject gas 208 can be recycled (208-RCYL) to the reformer 41 as feed.

Figure 5:
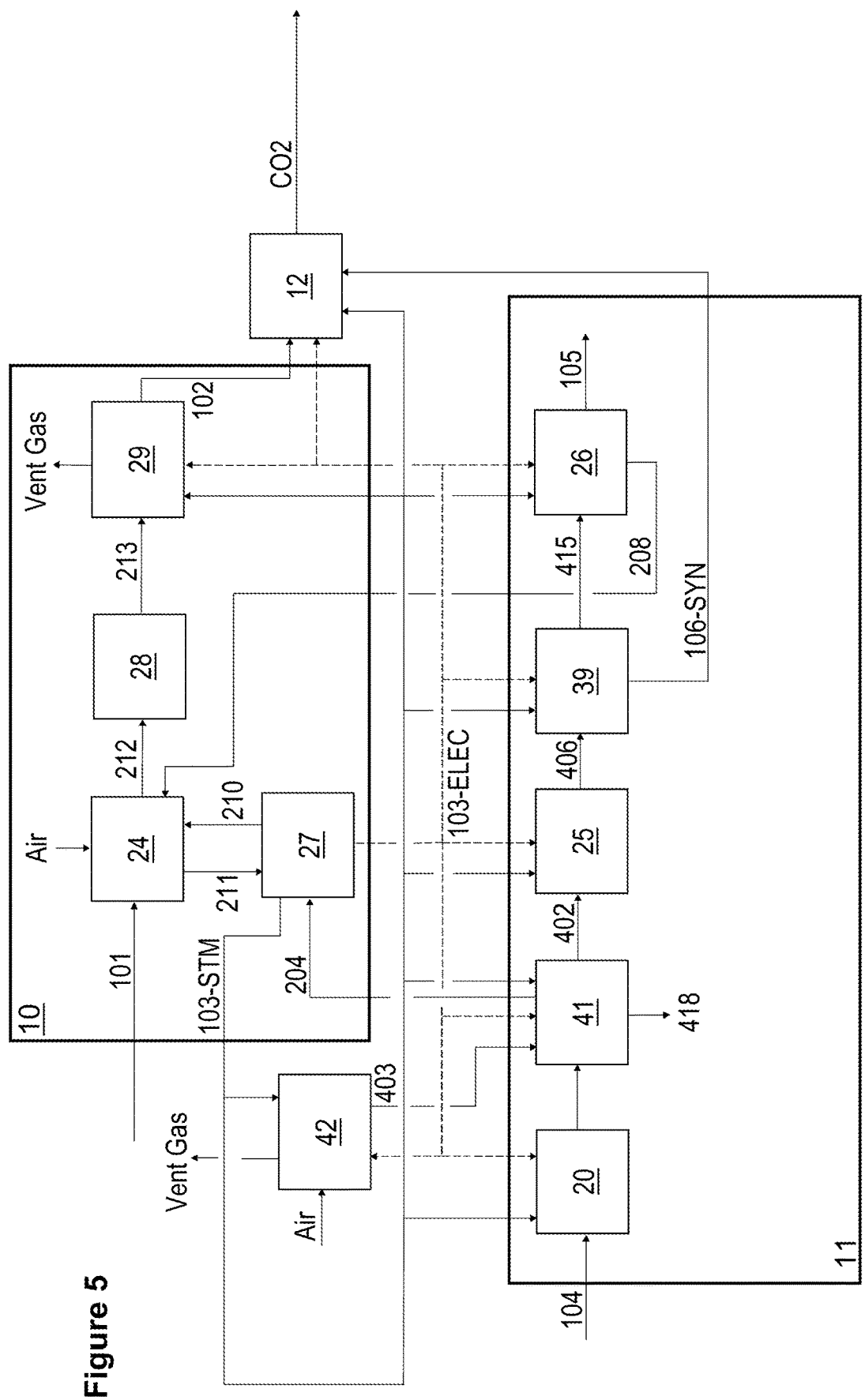
FIG. 5 depicts a process flow diagram for the process of FIG. 4, in which tail gas/reject gas is sent to the biomass power plant for conversion to energy.

In a fifth embodiment of the present invention, FIG. 5 illustrates a process flow that differs from FIG. 4 in the disposition of the hydrogen product purification tail gas/reject gas 208. Instead of routing tail gas/reject gas 208 to utility boiler 49 (as in FIG. 4) and/or recycling back to reformer 21 (as in FIG. 3), tail gas/reject gas 208 is sent to boiler 24 in biomass power plant 10. Compared to the process flow of FIG. 4, the configuration of FIG. 5 reduces the overall equipment count and further integrates the two facilities 10 and 11. The concept of sending the hydrogen product purification tail gas/reject gas 208 to biomass plant boiler 24 can also optionally be applied to the embodiments of FIG. 2 or FIG. 3.

FIG. 5 has the same preheating configurations as FIG. 4, including but not limited to a fired preheater and/or a GHR. Flue gas 418 from the fired preheater can either vent to atmosphere or be sent to a PCC unit depending on the desired carbon capture recovery. Where the configuration includes a standalone GHR, it is well understood that no flue gas would be generated.

Figure 6:
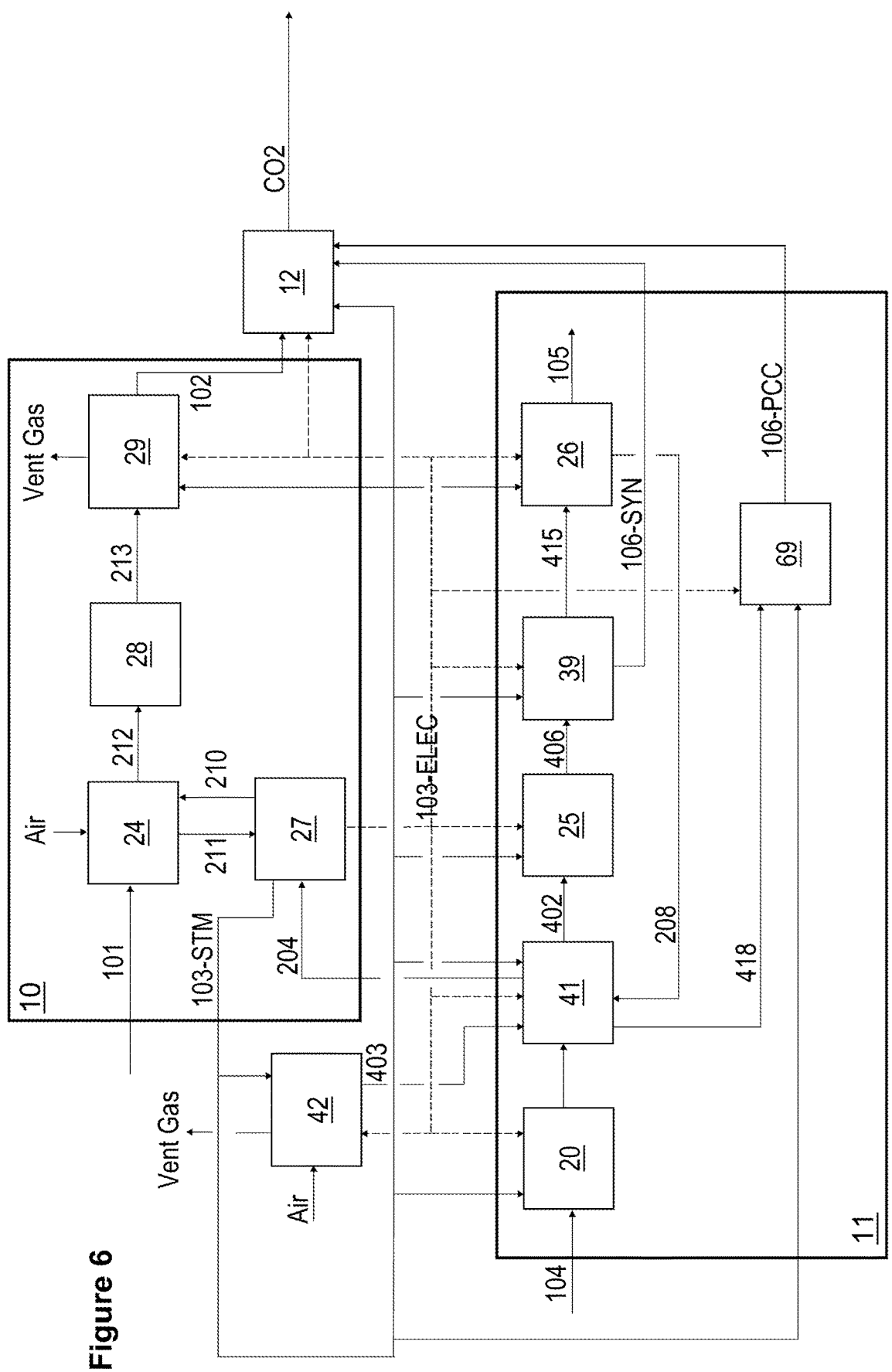
FIG. 6 depicts a process flow diagram for the process of FIG. 4, in which tail gas/reject gas is combusted in a fired preheater upstream of the auto-thermal reformer.

In a sixth embodiment of the present invention, FIG. 6 illustrates a process flow that differs from FIGS. 4 and 5 in the disposition of hydrogen product purification tail gas/reject gas 208. Tail gas/reject gas 208 can be combusted in the fired preheater upstream of ATR 41. The fuel gas to the fired preheater can also consist of a combination of natural gas, hydrogen, and/or tail gas/reject gas 208 from the hydrogen purification unit 26. Depending on the desired carbon dioxide recovery, the flue gas 418 from the fired preheater can be sent to PCC unit 69. PCC unit 69 can either be a cryogenic process or an amine-based solution. PCC 69 can receive carbon negative energy in three forms: (1) electrical power 103-ELEC that can be used to provide power to pump and/or compressor motors, including but not limited to the amine pumps (amine-based carbon capture), liquid carbon dioxide pumps (cryogenic carbon capture), auxiliary equipment, instrumentation, and controls; (2) thermal energy in the form of steam 103-STM for process heating requirements, including but not limited to the amine regenerator reboiler (amine-based carbon capture); or (3) steam drive energy to power the mechanical drive (e.g. turbines) of the pumps and/or compressors.

The captured carbon dioxide stream 106-PCC can be compressed in compression unit 12 for geologic sequestration or for uses external to the process.

Figure 7:
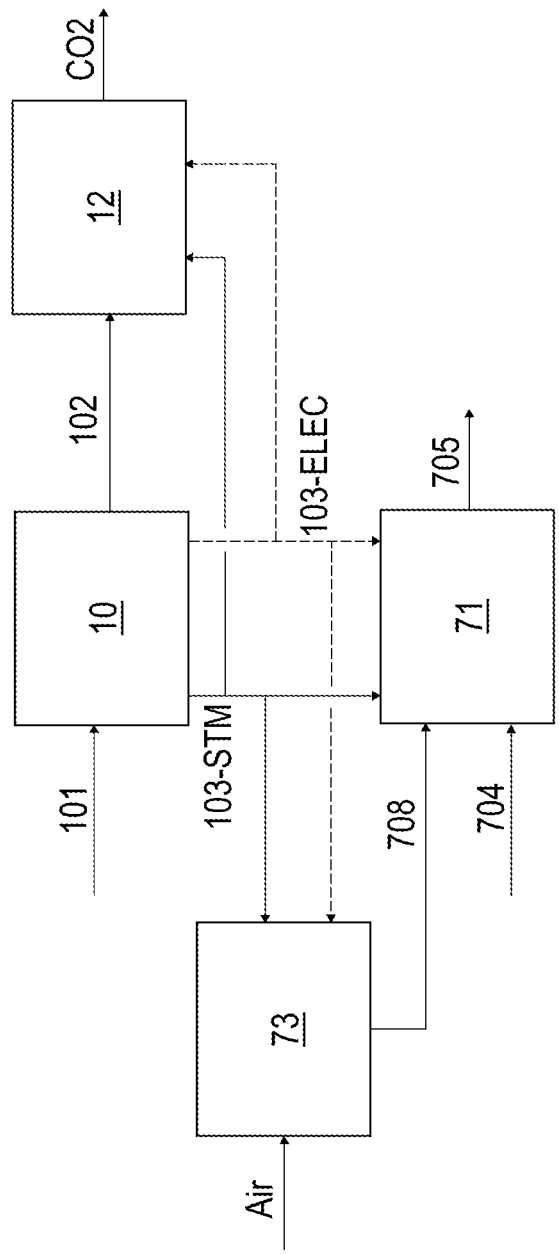
FIG. 7 depicts a process flow diagram for the production of the hydrogen-derivative ammonia, in which required energy is produced in a biomass power plant with carbon capture.

In a seventh embodiment of the present invention, FIG. 7 illustrates an embodiment in which carbon negative energy is supplied to the production of a hydrogen derivative, specifically ammonia. Ammonia product 705 is a low, neutral, and/or negative carbon intensity ammonia that can replace the traditional, carbon-intensive ammonia currently on the market. Similar to FIG. 1, biomass power plant 10 can supply either electricity 103-ELEC and/or steam 103-STM to ammonia synthesis 71 and/or ASU 73 and/or $CO_2$ compression unit 12. In ammonia synthesis 71, electricity 103-ELEC from biomass power plant 10 can be used to power the motor for compressors and/or pumps, power auxiliary equipment, instrumentation, and controls. Alternatively, steam 103-STM from biomass power plant 10 can be supplied directly to power the mechanical drive for compressors and/or pumps.

Unlike the hydrogen production embodiments (FIGS. 1-6), the ammonia synthesis 71 does not produce any carbon dioxide, since hydrogen 704 and nitrogen 708 are the only feedstocks. Biomass power plant 10 can offset the $CO_2e$ emissions associated with the production of hydrogen and/or $CO_2e$ emissions associated with import grid power and/or $CO_2e$ emissions associated with nitrogen production. Carbon dioxide 102 produced from biomass power plant 10 can be compressed in compression unit 12 for geologic sequestration or can be used external to the process.

Hydrogen 704 used for ammonia synthesis can be produced through the methods described in FIGS. 1-6, and/or can be provided at the plant fence line by a third-party supplier. Nitrogen 708 used for ammonia synthesis can be generated in ASU 73 and/or can be provided at the plant fence line by a third-party supplier.

ASU 73 can be combined with ASU 42 (FIGS. 4-6), which produces oxygen for ATR 41 (FIGS. 4-6). Carbon negative energy can be sent to ASU 73 as: (1) electrical power 103-ELEC that can be used to provide power to pump and/or compressor motors, including but not limited to the liquid oxygen pumps, electric heater for temperature swing absorption (TSA) bed regeneration, auxiliary equipment, instrumentation, and controls; (2) thermal energy in the form of steam 103-STM for process heating requirements, including but not limited to the TSA bed regeneration; or (3) steam drive energy to power the mechanical drive (e.g. turbines) of the pumps and/or compressors.

In an illustrative embodiment of the present invention, Table 2 demonstrates the required energy produced from a biomass power plant with carbon capture to achieve a hydrogen product having desired low carbon intensity for a 300 MMSCFD hydrogen production facility:

TABLE 2

| Carbon Dioxide Equivalent Balance for a 300 MMSCFD Hydrogen Production Facility | | | | |
|---|---|---|---|---|
| $CO_2e$ from Natural Gas (Upstream) | kg CO2e/day | 787,500 | 787,500 | 787,500 |
| $CO_2e$ from Local Electricity Grid | kg CO2e/day | 962,810 | 914,028 | 874,056 |
| $CO_2e$ vented onsite in H2 Production | kg CO2e/day | 53,829 | 53,829 | 53,829 |
| $CO_2e$ from Biomass (Upstream) | kg CO2e/day | 112,405 | 148,200 | 177,530 |
| $CO_2e$ captured from Biomass Power Plant | kg CO2e/day | (1,198,822) | (1,580,581) | (1,892,915) |
| Net $CO_2e$ | kg CO2e/day | 717,723 | 322,975 | (0) |
| Hydrogen Production | kg CO2e/day | 717,723 | 717,723 | 717,723 |
| Resulting Carbon Intensity | kg CO2e/kg H2 | 1.00 | 0.45 | 0.00 |
| Biomass Power Provided to H2 Production | MW | 13.73 | 18.10 | 21.68 |

As shown in Table 2, a hydrogen product having a carbon intensity of 1.0 kg $CO_2e$/kg $H_2$ would require 13.73 MW from a biomass power plant with carbon capture, in accordance with certain teachings of the present invention. A hydrogen product having a carbon intensity of 0.45 kg $CO_2e$/kg $H_2$ would require 18.10 MW from a biomass power plant with carbon capture, in accordance with certain teachings of the present invention. A hydrogen product having a carbon intensity of 0.0 kg $CO_2e$/kg $H_2$ would require 21.68 MW from a biomass power plant with carbon capture, in accordance with certain teachings of the present invention.

In yet another embodiment, the present invention is directed to a method for producing hydrogen product having a carbon intensity preferably less than about 1.0 kg $CO_2e$/kg $H_2$, more preferably less than about 0.45 kg $CO_2e$/kg $H_2$, and most preferably less than about 0.0 kg $CO_2e$/kg $H_2$. The method includes the steps of (a) converting a hydrocarbon feedstock to a hydrogen product using a hydrocarbon reforming process; (b) providing at least some of the required energy for the hydrogen production process from a biomass power plant; and (c) processing one or more flue gas streams from the biomass power plant in a carbon capture unit to reduce $CO_2$e emissions. The method further includes providing at least some of the required energy for the carbon capture unit from the biomass power plant. The method further includes providing substantially all of the required energy for the hydrogen production process from the biomass power plant. The energy produced from the biomass power plant may include: (a) electricity generated from work produced by a Rankine cycle, a Brayton cycle, or an IGCC; (b) steam that can be used as process steam in the reforming and water gas shift reactions; (c) steam that can be used as thermal energy; and (d) steam that can be used to power a mechanical drive for one or more compressors, pumps, or other motors generating shaft torque. The energy produced from the biomass power plant may be generated by direct combustion of the biomass feedstock, or by combustion of syngas produced from the gasification of the biomass feedstock. The biomass feedstock comprises one or more renewably sourced fuels selected from woody biomass, municipal solid waste, sorted municipal solid waste, food waste, agricultural waste, landfill diversion, hurricane and construction debris, industrial processing biomass waste, renewable natural gas, or a combination thereof. The biomass feedstock may also include one or more co-fired fossil fuels. The hydrogen production process may also produce a tail gas from the hydrogen purification unit that is also co-fired with the biomass feedstock in the biomass power plant.

In yet another embodiment, the present invention is directed to a method for producing hydrogen product having a carbon intensity preferably less than about 1.0 kg $CO_2$e/kg $H_2$, more preferably less than about 0.45 kg $CO_2$e/kg $H_2$, and most preferably less than about 0.0 kg $CO_2$e/kg $H_2$. The method includes the steps of (a) converting a hydrocarbon feedstock to a hydrogen product using a hydrocarbon reforming process; (b) providing at least some of the required energy for the hydrogen production process from a biomass power plant; and (c) processing one or more gas streams containing carbon dioxide from the biomass power plant and the hydrogen production process in one or more carbon capture units to reduce $CO_2$e emissions. The energy produced from the biomass power plant may include: (a) electricity generated from work produced by a Rankine cycle, a Brayton cycle, or an IGCC; (b) steam that can be used as process steam in the reforming and water gas shift reactions; (c) steam that can be used as thermal energy; and (d) steam that can be used to power a mechanical drive for one or more compressors, pumps, or other motors generating shaft torque. The method further includes providing at least some of the required energy for the one or more carbon capture units from the biomass power plant. The method further includes providing substantially all of the required energy for the hydrogen production process from the biomass power plant. The hydrocarbon reforming process is selected from autothermal reforming, steam reforming, or a combination of autothermal reforming and steam reforming. The hydrocarbon feedstock is selected from natural gas, renewable natural gas, biogas, refinery off-gases, fuel gas, naphtha, renewable naphtha, or a combination thereof. The hydrogen production process comprises pressurizing the hydrocarbon feedstock, such as through compression (gas feed) or pumping (liquid feed), wherein at least some of the required energy for the feedstock pressurization is provided from the biomass power plant. When the hydrogen production process uses a steam reforming reaction, a syngas product is produced, wherein at least some of the process steam for the steam reforming reaction is provided from the biomass power plant. The method further includes the step of converting the syngas product in a water gas shift reaction to a product comprising carbon dioxide and hydrogen, wherein at least some of the process steam for the water gas shift reaction is provided from the biomass power plant. The method further includes the step of processing the carbon dioxide/hydrogen product in a syngas carbon capture unit to create a purified carbon dioxide product and reduce $CO_2$e emissions, wherein at least some of the required energy for the syngas carbon capture unit is provided from the biomass power plant. The method further includes the step of pressurizing the purified carbon dioxide product, wherein at least some of the required energy for the carbon dioxide pressurization is provided from the biomass power plant. The method further includes the step of processing a flue gas stream in a post-combustion carbon capture unit to create a purified carbon dioxide product and reduce $CO_2$e emissions, wherein at least some of the required energy for the post-combustion carbon capture unit is provided from the biomass power plant. The method further includes the step of pressurizing the purified carbon dioxide product from the post-combustion carbon capture unit, wherein at least some of the required energy for the carbon dioxide pressurization is provided from the biomass power plant. The method further includes the step of combusting as a tail gas from the hydrogen purification unit with the biomass feedstock in the biomass power plant. The method further includes the step of compressing the hydrogen product, wherein at least some of the required energy for the hydrogen product compression is provided from the biomass power plant.

In yet another embodiment, a hydrogen product produced according to the preceding embodiments is provided. The hydrogen product preferably has a carbon intensity less than about 1.0 kg $CO_2$e/kg $H_2$, more preferably less than about 0.45 kg $CO_2$e/kg $H_2$, and most preferably less than about 0.0 kg $CO_2$e/kg $H_2$.

In yet another embodiment the present invention is directed to a method for producing ammonia product having a carbon intensity preferably less than about 1.0 kg $CO_2$e/kg $NH_3$, more preferably less than about 0.5 kg $CO_2$e/kg $NH_3$, and most preferably less than about 0.0 kg $CO_2$e/kg $NH_3$. The method includes the steps of: (a) converting a hydrocarbon feedstock to a hydrogen intermediate product using a hydrocarbon reforming process; (b) converting the hydrogen intermediate product to an ammonia product using an ammonia synthesis process; (c) providing at least some of the required energy for the hydrogen production process and the ammonia synthesis process from a biomass power plant; and (d) processing one or more gas streams containing carbon dioxide from the biomass power plant and the hydrocarbon reforming process in one or more carbon capture units to reduce $CO_2$e emissions. The method further includes providing at least some of the required energy for the one or more carbon capture units from the biomass power plant. The method further includes providing substantially all of the required energy for the one or more carbon capture units from the biomass power plant. The method further includes providing substantially all of the required energy for the hydrocarbon reforming process from the biomass power plant. The method further includes providing substantially all of the required energy for the ammonia synthesis process from the biomass power plant.

The energy produced from the biomass power plant may include: (a) electricity generated from work produced by a Rankine cycle, Brayton cycle, or integrated gasification combined cycle; (b) steam that can be used as process steam in the reforming and water gas shift reactions; (c) steam that can be used as thermal energy; and (d) steam that can be used to power a mechanical drive for one or more compressors, pumps, or other motors generating shaft torque. The biomass feedstock for the biomass power plant comprises one or more renewably sourced fuels selected from woody biomass, municipal solid waste, sorted municipal solid waste, food waste, agricultural waste, landfill diversion, hurricane and construction debris, industrial processing biomass waste, renewable natural gas, or a combination thereof. The biomass feedstock may also include one or more co-fired fossil fuels. The hydrogen production process may also produce a tail gas from the hydrogen purification unit that is also co-fired with the biomass feedstock in the biomass power plant. The hydrocarbon reforming process is selected from autothermal reforming, steam reforming, or a combination of autothermal reforming and steam reforming. The hydrocarbon feedstock is selected from natural gas, renewable natural gas, biogas, refinery off-gases, fuel gas, naphtha, renewable naphtha, or a combination thereof. The ammonia synthesis process comprises a syngas compressor that compresses the hydrogen intermediate product and nitrogen to an ammonia converter, wherein at least some of the required energy for the syngas compressor is provided by the biomass power plant. The ammonia synthesis process comprises ammonia refrigeration, wherein at least some of the required energy for the ammonia refrigeration is provided from the biomass power plant. The ammonia synthesis process comprises ammonia product pressurization, wherein at least some of the required energy for the ammonia product pressurization is provided from the biomass power plant. The ammonia synthesis process comprises an air separation unit to provide high purity nitrogen to the ammonia synthesis process, wherein at least some of the required energy for the air separation unit is provided from the biomass power plant.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and sprit of the present invention.

What is claimed is:

1. A method for producing ammonia product having a carbon intensity less than about 0.5 kg $CO_2e$/kg $NH_3$, comprising:
   converting a hydrocarbon feedstock to a hydrogen intermediate product using a hydrogen production process;
   converting the hydrogen intermediate product to an ammonia product using an ammonia synthesis process;
   providing at least some of the required energy for the hydrogen production process and the ammonia synthesis process from a biomass power plant comprising the direct combustion of a biomass feedstock; and
   processing one or more gas streams containing carbon dioxide from the biomass power plant and the hydrogen production process in one or more carbon capture units to reduce $CO_2e$ emissions;
   wherein the ammonia product has a carbon intensity less than about 0.5 kg $CO_2e$/kg $NH_3$.

2. The method of claim 1, further comprising providing at least some of the required energy for the one or more carbon capture units from the biomass power plant.

3. The method of claim 1, further comprising providing substantially all of the required energy for the hydrogen production process from the biomass power plant.

4. The method of claim 1, further comprising providing all of the required energy for the ammonia synthesis process from the biomass power plant.

5. The method of claim 1, wherein the energy produced from the biomass power plant comprises steam that can be used as process steam in the hydrogen production process.

6. The method of claim 1, wherein the energy produced from the biomass power plant comprises steam that can be used as thermal energy.

7. The method of claim 1, wherein the energy produced from the biomass power plant is steam that can be used to power a mechanical drive.

8. The method of claim 1, wherein the biomass feedstock for the biomass power plant comprises one or more renewably sourced fuels selected from woody biomass, municipal solid waste, sorted municipal solid waste, food waste, agricultural waste, landfill diversion, hurricane and construction debris, industrial processing biomass waste, renewable natural gas, or a combination thereof.

9. The method of claim 8, wherein the biomass feedstock for the biomass power plant is co-fired with one or more fossil fuels.

10. The method of claim 1, wherein the hydrogen production process produces a tail gas that is combusted with the biomass feedstock in the biomass power plant.

11. The method of claim 1, wherein the hydrogen production process is selected from autothermal reforming, steam reforming, or a combination of autothermal reforming and steam reforming.

12. The method of claim 1, wherein the hydrocarbon feedstock is selected from natural gas, renewable natural gas, biogas, refinery off-gases, fuel gas, naphtha, renewable naphtha, or a combination thereof.

13. The method of claim 1, wherein the hydrogen production process comprises pressurizing the hydrocarbon feedstock, wherein at least some of the required energy for the feedstock pressurization is provided from the biomass power plant.

14. The method of claim 1, wherein the hydrogen production process comprises producing a syngas product by a steam reforming reaction, wherein at least some of the process steam for the steam reforming reaction is provided from the biomass power plant.

15. The method of claim 14, further comprising converting the syngas product in a water gas shift reaction to a product comprising carbon dioxide and hydrogen, wherein at least some of the process steam for the water gas shift reaction is provided from the biomass power plant.

16. The method of claim 15, wherein the hydrogen production process comprises processing the product comprising carbon dioxide and hydrogen in a syngas carbon capture unit to create a purified carbon dioxide product and reduce $CO_2e$ emissions, wherein at least some of the required energy for the syngas carbon capture unit is provided from the biomass power plant.

17. The method of claim 16, wherein the syngas carbon capture unit comprises pressurizing the carbon dioxide product, wherein at least some of the required energy for the carbon dioxide pressurization is provided from the biomass power plant.

18. The method of claim 1, wherein the hydrogen production process comprises processing a flue gas stream in a post-combustion carbon capture unit to create a purified carbon dioxide product and reduce $CO_2e$ emissions, wherein at least some of the required energy for the post-combustion carbon capture unit is provided from the biomass power plant.

19. The method of claim 18, wherein the post-combustion capture unit comprises pressurizing the carbon dioxide product, wherein at least some of the required energy for the carbon dioxide pressurization is provided from the biomass power plant.

20. The method of claim 1, wherein the hydrogen production process produces a tail gas that is combusted with the biomass feedstock in the biomass power plant.

21. The method of claim 1, wherein the ammonia synthesis process comprises a syngas compressor that compresses the hydrogen intermediate product and nitrogen to an ammonia converter, wherein at least some of the required energy for the syngas compressor is provided by the biomass power plant.

22. The method of claim 1, wherein the ammonia synthesis process comprises ammonia refrigeration, wherein at least some of the required energy for the ammonia refrigeration is provided from the biomass power plant.

23. The method of claim 1, wherein the ammonia synthesis process comprises ammonia product pressurization, wherein at least some of the required energy for the ammonia product pressurization is provided from the biomass power plant.

24. The method of claim 1, wherein the hydrogen production process comprises an air separation unit to provide high purity oxygen to the hydrogen production process, wherein at least some of the required energy for the air separation unit is provided from the biomass power plant.

25. The method of claim 1, wherein the ammonia synthesis process comprises an air separation unit to provide high purity nitrogen to the ammonia synthesis process, wherein at least some of the required energy for the air separation unit is provided from the biomass power plant.

26. The method of claim 1, wherein the ammonia product has a carbon intensity less than about 0.0 kg $CO_2e$/kg $NH_3$.

* * * * *